US007045607B2

(12) United States Patent
Cheryan

(10) Patent No.: US 7,045,607 B2
(45) Date of Patent: *May 16, 2006

(54) METHOD AND SYSTEM FOR EXTRACTION OF ZEIN FROM CORN

(75) Inventor: Munir Cheryan, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/913,790

(22) Filed: Aug. 6, 2004

(65) Prior Publication Data

US 2005/0049400 A1    Mar. 3, 2005

Related U.S. Application Data

(63) Continuation-in-part of application No. 10/190,365, filed on Jul. 3, 2002, which is a continuation of application No. 09/313,690, filed on May 18, 1999, now Pat. No. 6,433,146.

(51) Int. Cl.
*A23J 1/00* (2006.01)

(52) U.S. Cl. ........................................ 530/414; 530/412

(58) Field of Classification Search ................ 530/350, 530/412, 414
See application file for complete search history.

(56) References Cited

U.S. PATENT DOCUMENTS

| | | | |
|---|---|---|---|
| 3,962,335 A | 6/1976 | Kumar | |
| 3,963,575 A | 6/1976 | Bulich | |
| 4,093,540 A | 6/1978 | Sen Gupta | |
| 4,224,219 A | 9/1980 | Van Blanton et al. | |
| 4,414,157 A | 11/1983 | Iwama et al. | |
| 4,486,353 A | 12/1984 | Matsuzaki et al. | |
| 4,545,940 A | 10/1985 | Mutoh et al. | |
| 4,624,805 A | 11/1986 | Lawhon | |
| 4,716,218 A | 12/1987 | Chen et al. | |
| 4,787,981 A | 11/1988 | Tanahashi et al. | |
| 5,077,441 A | 12/1991 | Kuk et al. | |
| 5,166,376 A | 11/1992 | Suzuki et al. | |
| 5,254,673 A | 10/1993 | Cook et al. | |
| 5,310,487 A | 5/1994 | LaMonica | |
| 5,342,923 A | 8/1994 | Takahashi et al. | |
| 5,367,055 A | 11/1994 | Takahashi et al. | |
| 5,410,021 A | 4/1995 | Kampen et al. | |
| 5,482,633 A | 1/1996 | Muralidhara et al. | |
| 5,510,463 A | 4/1996 | Takahashi et al. | |
| 5,545,329 A | 8/1996 | LaMonica | |
| 5,580,959 A | 12/1996 | Cook et al. | |
| 5,602,286 A | 2/1997 | Muralidhara | |
| 5,773,076 A | 6/1998 | Liaw et al. | |
| 6,365,732 B1 | 4/2002 | Van Thorre | |
| 6,433,146 B1 * | 8/2002 | Cheryan | 530/373 |
| 2003/0176669 A1 | 9/2003 | Van Thorre | |

OTHER PUBLICATIONS

Cao et al., Enzymatic Hydrolysis of Corn Starch After Extraction of Corn Oil with Ethanol, Applied Biochem. and Biotech., (1996), 57/58, p. 39-47.*

Singh et al., Memebrane technology in Corn Wet Milling, cereal Foods World, (1997), vol. 42, No. 7, p. 520-525.*

N. Singh, M. Cheryan, "Extraction of Oil from Corn Distillers Dried Grains with Solubles", *Transactions of the ASAE*, vol. 41, No. 6, pp. 1-3.

M. Cheryan, Ultrafiltration and Microfiltration Handbook, Lancaster, PA; Technomic Publishing Co. 1998.

D. Chang, M.P. Hojilla-Evangelista, L.A. Johnson, D.J. Myers, "Economic-Engineering Assessment of Sequential Processing of Corn", *Transactions of the ASAE*, vol. 38, No. 4, 1995, pp. 1129-1138.

J.T. Chien, J.E. Hoff, L.F. Chen, "Simultaneous Dehydration of 95% Ethanol and Extraction of Crude Oil from Dried Ground Corn", *Cereal Chem.*, vol. 65, No. 6, 1988, pp. 484-486.

J.T. Chien, J.E. Hoff, M.J. Lee, H.M. Lin, Y.J. Chen, L.F. Chen, "Oil Extraction of Dried Ground Corn with Ethanol", *Chemical Engineering Journal*, vol. 43, 1990, pp. B103-B113.

L.C. Dickey, M.F. Dallmer, E.R. Radewonuk, N. Parris, M. Kurantz, J.C. Craig, Jr., "Hydrocyclone Separation of Dry- (Continued)

*Primary Examiner*—Karen Cochrane Carlson
*Assistant Examiner*—Agnes Rooke
(74) *Attorney, Agent, or Firm*—Greer, Burns & Crain, Ltd.

(57) ABSTRACT

A corn product removal process for removing zein and/or oil from dry-milled corn. Oils and/or zein are extracted from corn using ethanol. Corn solids are separated from the ethanol, oil and zein mixture produced by extracting. Thereafter, the ethanol, oil and zein mixture is membrane filtered to restrain zein from the mixture and pass an oil and ethanol mixture. The zein and/or oil may be concentrated and purified.

22 Claims, 3 Drawing Sheets

OTHER PUBLICATIONS

Milled Corn", *Cereal Chem*, vol. 74, No. 5, 1997, pp. 676-680.

M.P. Hojilla-Evangelista, L.A. Johnson, D.J. Myers, "Sequential Extraction Processing of Flaked Whole Corn: Alternative Corn Fractionation Technology with Ethanol Production", *Cereal Chem*, vol. 69, No. 6, 1992, pp. 643-647.

N. Singh, M. Cheryan, "Membrane Technology in Corn Wet Milling", *Cereal Foods World*, vol. 42, No. 7, 1997, pp. 520-525.

"Membrane Technology in Corn Refining and Bioproduct-Processing", Starch/Stärke, vol. 50, No. 1, 1998, pp. 16-23.

V. Singh, S.R. Eckhoff, "Effect of Soak Time, Soak Temperature and Lactic Acid on Germ Recovery Parameters", *Cereal Chem.*, vol. 73, No. 6, pp. 716-720.

Abstract of Funded Research Fiscal Year 1997, (Cheryan, M. abstract No. 9701992) 1997, [om-line], [retrieved on Sep. 22, 2000]. Retrieved from the internet: <URL: http://www.reeusda.gov/nri/pubs/archive/abstracts/abstract97/contents.htm and http://www.reeu.

\* cited by examiner

METHOD AND SYSTEM FOR EXTRACTION OF ZEIN FROM CORN

CROSS-REFERENCE TO RELATED APPLICATIONS

This application is a continuation-in-part of U.S. application Ser. No. 10/190,365, filed Jul. 3, 2002, which is a continuation of U.S. application Ser. No. 09/313,690, filed May 18, 1999, now U.S. Pat. No. 6,433,146, issued Aug. 13, 2002.

FIELD OF THE INVENTION

The present invention generally concerns corn milling processes and machines.

BACKGROUND OF THE INVENTION

There are two primary types of corn processing conducted presently: dry grind and wet milling processes. The wet milling processes are efficient in their use of corn since they produce numerous high value corn products, such as corn oil, starch, corn gluten meal, corn gluten feed, and corn steep liquor. However, the wet milling processes require very high capital investments in machinery. Dry grind processes are used to produce ethanol and animal feed. Animal feed is substantially less valuable than corn oil and zein, which are left in the animal feed produced by a dry mill process. A reason for existence of the dry grind plants to date has been government ethanol subsidies, which are likely to disappear.

Some methods to extract oil and zein from dry mill corn have been proposed in the literature, but have yet to demonstrate efficiency meeting commercial production requirements. One type of proposed method is embodied in U.S. Pat. No. 4,716,218 and a "Sequential Extraction Process" developed at Iowa State University. This type of method uses ethanol to extract oil and zein. Evaporation is required to remove the ethanol, and then hexane-extraction is used to separate the oil from the zein with further subsequent evaporation of the hexane from the oil. These are relatively complicated processes. They are also expensive due to their energy intensive nature. Significant heating requirements result from the multiple required evaporations. Further, the evaporations create pollution concerns.

Another proposed method to remove oil from dry-milled corn is mechanical degermination. This method produces corn germ with less than approximately 50 percent oil. The germ must be subsequently processed to recover the oil. No ability to recover zein is presented by this method, however, and there is no known utilization of the method to obtain corn oil and zein in a manufacture scaled product.

Thus, there is a need for an improved method capable of using dry grind corn, as well as wet milled corn product, to produce one or more corn products of value. It is an object of the invention to provide such a method. It is a further object of the invention to provide a method for extracting corn oil and/or protein (particularly zein), which method is capable of utilizing dry grind corn or wet milled corn product through ethanol treatment with filtration.

SUMMARY OF THE INVENTION

The method of the present invention obtains zein, and in some cases, oil, from various forms of corn to meet or exceed such needs. Membranes are relied upon to filter the zein and/or oils. Input to the corn process of the invention is corn of multiple forms. Ethanol is the only reagent utilized by the process, and conventional dry and wet mill plants therefore already provide the necessary reagent supply for implementation of the invention, though ethanol from any source may be used.

The invention may serve as the basis for an add-on technology to an existing dry mill or wet mill plant, as well as the basis upon which new dry mill and wet plants may be constructed. Dry mill plants are likely to benefit significantly from preferred embodiments of the invention, since the invention provides ways to extract more valuable zein and/or oil from the corn while making use of the basic dry mill equipment and products of conventional dry mill plants.

A plant modified or constructed to implement a preferred process of the invention may use high concentration ethanol, approximately 90–100% ethanol, to separate oil from the corn. The corn may be in any form, e.g., wet mill product, dry flakes, dry particles, or whole kernels.

Alternatively or additionally, zein protein may be partially or substantially extracted using an ethanol extraction step with an ethanol concentration between approximately 60 and 90%. The ethanol solution containing the extracted product is separated from other corn solids by filtration or centrifugation. Membranes are used to separate the zein, producing relatively pure zein and/or pure oil. Additional membrane filtration may be used to concentrate the zein and/or oil, and to recover the ethanol for further use in processing, if desired. Recycled ethanol may then be used in additional extraction of zein and/or oil, or may be used in a distillation operation if ethanol product is also being produced by the plant.

BRIEF DESCRIPTION OF THE DRAWINGS

Other features, objects, and advantages of the invention will be apparent to those skilled in the art from the following detailed description and by reference to the drawings, of which.

DETAILED DESCRIPTION OF THE INVENTION

The invention extracts oil and/or zein from corn or corn processing by-products using ethanol, and relies upon membrane filtration to obtain high value oil and/or zein concentrate. The extraction is done in a continuous countercurrent, co-current or mixed flow extraction system. The sole reagent relied upon by the process is ethanol, which may be recycled for additional extraction or may be used to produce ethanol product.

Figure 1:
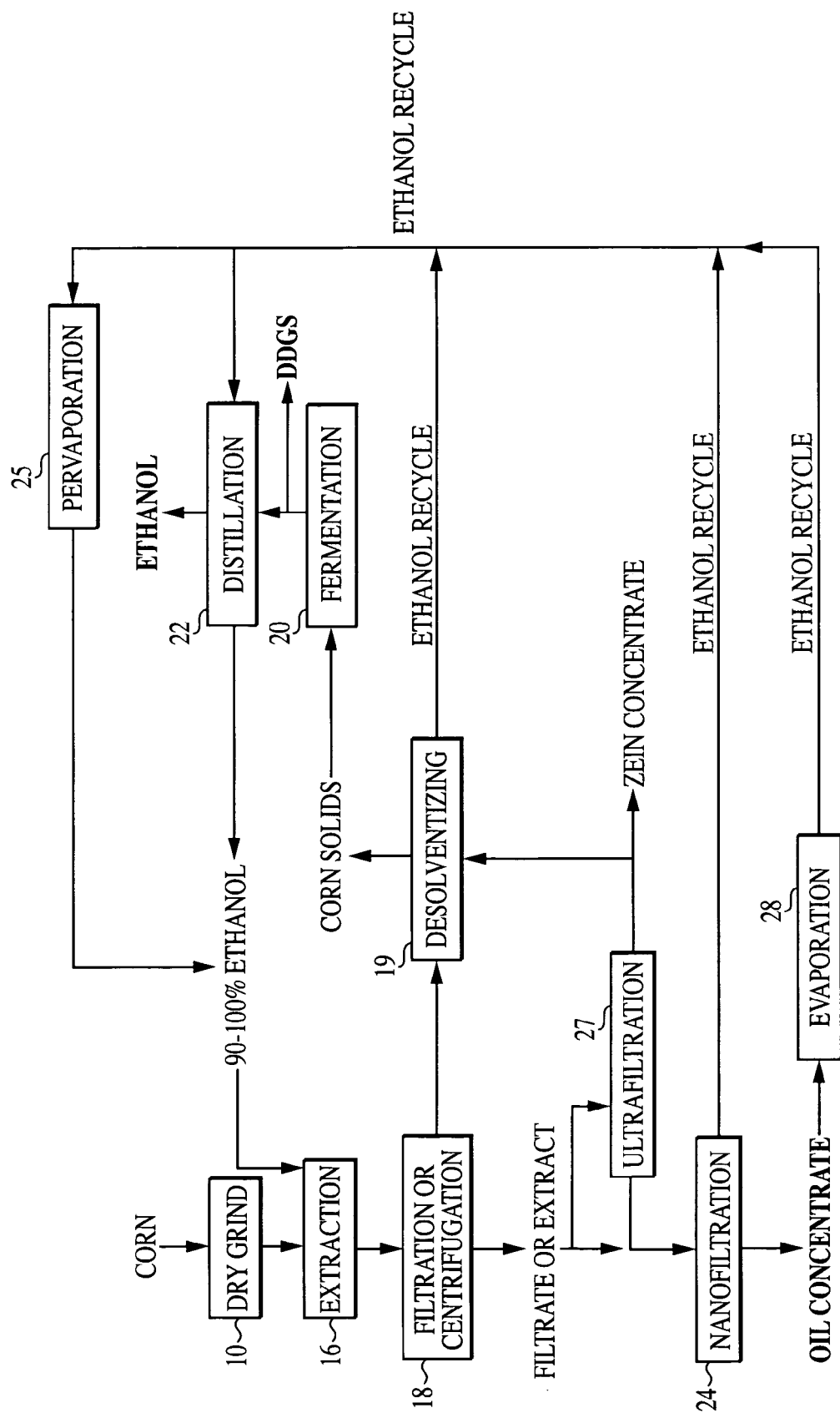
FIG. 1 illustrates corn oil production according to principles of the present invention.

Referring now to FIG. 1, shown is a flow diagram of an oil concentrate extraction application of the invention to a dry mill ethanol plant. Corn or corn processing by-products are input to a dry grind processing step 10. The corn may be, for example, whole kernel or flaked corn. If corn processing by-products such as DDG or DDGS (distiller dried grains, with solubles), corn gluten meal, corn germ, or corn meal are used, this step 10 may not be necessary. In all cases, moisture content of feed material should be 0–14% by weight. The corn and ethanol are mixed in step 16 for extraction of oil. The temperature of extracting should be 50–90° C., preferably close to the boiling point of ethanol (78° C.) if 100% ethanol is used. The time of extraction should be 10–120 minutes, preferably 30 minutes if a batch extraction is done.

The mixing step prepares the corn for a preliminary extraction step 16. Small processing plants might use batch extraction, and larger plants could use continuous-counter current extraction. Oil extraction uses ethanol of between approximately 90–100% concentration, however, it is noted that oil extraction at around 90% ethanol is highly inefficient, and at least a 95% concentration is preferred. The ethanol is preferably supplied by the plant conducting the process of the invention, and, since it may be one of the corn products produced by application of the present process, a self sustaining supply is provided by the plant. No other reagent is required.

A separation step 18, e.g., filtration or centrifugation, is conducted to remove corn solids from an ethanol, zein, and oil mixture produced by the extraction step 16. The objective of the separation step is to remove substantially all suspended corn solids from the dissolved corn mixture of ethanol, oil, and small portions of the ethanol-soluble protein zein. Some zein will not be extracted from the corn solids. If zein is the primary objective, the ethanol concentration may be adjusted within the aforementioned 60–90% range to optimize zein extraction. Generally, ethanol concentrations in the higher end of the range will extract less zein than ethanol concentrations in the lower end of the range.

The separated corn solids from step 18 are subjected to a desolventizing step 19 to remove any ethanol that may be adsorbed in the corn solids. The ethanol recovered from desolventizing step 19 is recycled to the distillation section of the plant. The desolventized corn solids provide the necessary input for conventional ethanol production according to conventional techniques. Thus, in a plant embodying preferred methods and systems of the invention, fermentation and distillation steps 20 and 22 are preferably conducted to produce an ethanol supply for the extraction step 16. Fuel ethanol and distillers dried grains with solubles (DDGS—an animal feed) may also be output as product from a plant modified or constructed to implement the invention.

The filtrate from step 18 containing oil, ethanol, and co-extracted components such as zein is then processed in a nanofiltration step 24 using a membrane to restrain oil while allowing ethanol to pass through. Corn oil has a molecular weight of about 800–900 daltons. Selection of an appropriate membrane is therefore straightforward. Nanofiltration membranes that are stable in ethanol, such as those made by Koch Membrane Systems, Osmonics-Desal or USFilter can be used. The retentate from this step is corn oil concentrate while the permeate containing ethanol is recycled back for extracting or processed further by distillation in step 22 or pervaporation in step 25.

If necessary, the filtrate from step 18 can be first passed through an ultrafiltration membrane 27 that will restrain the zein and other co-extracted components that are larger than the oil in molecular size. This ultrafiltration retentate can be further processed to produce zein as a separate product or be sent to step 19 for desolventizing and the zein recycled back to the ethanol production section. The ultrafiltration permeate now contains oil and ethanol, which can go to the nanofiltration step 24 as described earlier.

The retentate of the nanofiltration operation in step 24, containing concentrated oil in ethanol, may then be subjected to evaporation in step 28 to produce corn oil, while the ethanol vapors are recycled to the ethanol production section.

Depending on the moisture content of the corn and the manner in which the plant is operated, the ethanol extractant may absorb water during the extraction, filtration, and membrane processing steps. This water must be removed from the ethanol recycle streams to maintain its effectiveness for extracting oil. This can be done either by distillation as, for example, in a separate distillation column or in the distillation section of the ethanol plant. Water can also be removed from the recycle ethanol stream by another membrane technology known as pervaporation in step 25. In any case, the ethanol must be adjusted to within 90–100% ethanol concentration prior to being used in the extraction step 16.

Figure 2:
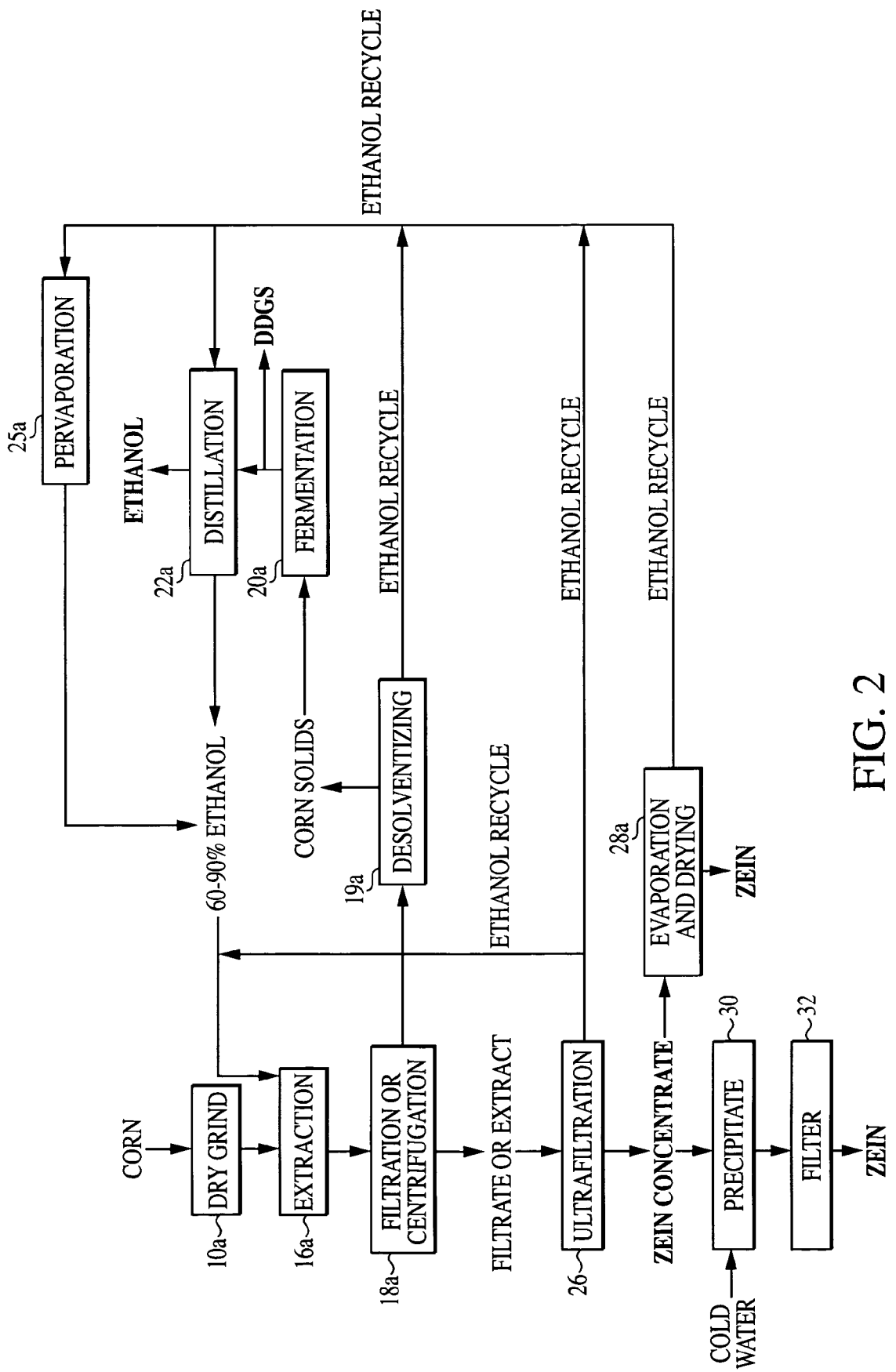
FIG. 2 illustrates zein production according to principles of the present invention.

Referring now to FIG. 2, the process of the invention for a plant primarily focused on zein production is illustrated. A preferred process simultaneously concentrates and purifies zein in an ethanol extract using appropriate membranes. Steps similar to those shown and discussed with respect to FIG. 1 are labeled with like reference numerals. The zein extraction preferably begins with whole or raw corn, and subjected to dry grind step 10a. For example, a whole ground corn, such as yellow dent #2, may be milled into coarse particles with a hammer mill fitted with a screen (0.19", e.g.), and milled into fine powder using a hammer mill fitted with a screen (0.025", e.g.).

The extraction step 16a uses a lower concentration extractant than that which is used in FIG. 1. The extractant should preferentially extract zein from corn but not oil, though trace amounts of oil and oil-based components, such as free fatty acids, may be extracted. Ethanol concentrations in the range of 60–90% ethanol in water have been found effective, and a 70% ethanol, 30% water extractant solution is preferred. It is contemplated that isopropyl alcohol (IPA) could be included in the extractant solution in some extraction processes. For example, 5% IPA is contemplated, so that a solution of 70 parts of (5% IPA+95% ethanol) to 30 parts water is used. The extractant/water solution: corn (ground) ratio preferably is between 10:1 and 2:1 volume/weight, most preferably 4:1 volume/weight, for example 4 liters of extractant solution to 1 kilogram of ground corn. However, a ratio as low as 1:1 is also contemplated. The corn and extractant are mixed in step 16a for extraction of zein. The temperature of extraction should be 25–65° C., (preferably 50° C.) if 60–70% ethanol is used. The time of extraction should be 10–120 minutes, more preferably between 30 and 60 minutes and most preferably 30 minutes if a batch extraction is done.

The extractant solution is obtainable from within the distillation section of the plant or by adding water to the output of the distillation step 22a. The filtration step 18a will separate other corn solids for processing, if desired, as discussed above. For example, corn solids may be separated by use of a filter or a centrifugal device such as a decanter. A filter aid such as, but not limited to, celite, may be added in the filtration step 18a if needed, depending on, for example, the filtration equipment, the type of filter cloth or paper, etc., and the particle size of the solids being separated. As an example of post-separation processing, the separated corn solids from step 18a are subjected to a desolventizing step 19a to remove any ethanol that may be adsorbed in the corn solids. The ethanol recovered from step 19a is recycled to the distillation section of the plant, and may be used, for example, for additional extraction and/or diafiltration. The desolventized corn solids provide the necessary input for conventional ethanol production.

The filtrate from step 18a containing oil, ethanol, and co-extracted components such as a small quantity of oil that may be soluble at certain ethanol concentrations is then processed in a membrane ultrafiltration step 26 to restrain zein while allowing ethanol to pass through. For example, the membranes may be synthetic, semipermeable membranes. Zein proteins have molecular weights of about 12,000–40,000 daltons. Selection of an appropriate membrane with approximate molecular weight cut-offs of 5000 to 20,000 daltons is therefore straightforward. Ultrafiltration membranes that are stable in ethanol, such as those made by Koch Membrane Systems, Osmonics-Desal, Millipore, Amicon, PCI Membrane Systems, PTI, USFilter, MTR, etc. can be used. It may be desired to preheat the filtrate or extract from step 18a before the ultrafiltration step 26. The retentate from the ultrafiltration step 26 is zein concentrate, while the permeate containing ethanol is recycled back for extraction with make-up ethanol from the distillation section of the plant if needed, or processed further by distillation in step 22a or by pervaporation in step 25a.

Alternatively or additionally, diafiltration may be used in step 26 to purify the zein. For example, fresh solvent (e.g., 70–100% ethanol) may be added to the zein to wash the zein during ultrafiltration. The ultrafiltration and/or diafiltration step 26 may be repeated several times to further purify and/or concentrate the zein. If diafiltration is repeated, it may be desirable to add the fresh solvent in stages to the retentate for further purification of the zein. For example, a later stage of diafiltration may use a higher ethanol concentration (e.g., 80%–100% v/v).

The stream restrained by the membrane filtration step 26 contains concentrated zein in a 70% ethanol solution (if 70% ethanol/30% water was used for extraction and diafiltration). If higher ethanol concentrations are used in the diafiltration steps, the restrained stream from the filtration step 26 will contain concentrated zein and higher ethanol concentrations. After the filtration step 26, alternative steps can be used to further concentrate and purify the zein. A first alternative step is evaporation and drying step 28a. For example, purified zein extract may be concentrated using an evaporator under vacuum, and dried using a spray dryer. The spray drier may have, for example, an inlet air temperature between 120–125° C., an outlet air temperature between 70–75° C., and a feed temperature at room temperature.

Ethanol-water vapors produced by step 28a may be sent for recovery by distillation step 22a, pervaporation step 25a or condensed directly for use in the extraction step 16a. A second alternative step is to send the zein and ethanol stream to a precipitation step 30, where zein is precipitated out. Adding cold water to reduce the ethanol concentration below 40% will cause the zein to precipitate out. A filtration step 32 then produces zein concentrate. Filtrate from this step containing ethanol-water is recycled for further extraction, fermentation, or distillation, as discussed above with respect to FIG. 1.

The following is a description of several membrane process experiments. This series of experiments illustrates conducting the process in the ultrafiltration/concentration and the diafiltration modes.

Materials: Whole ground corn (yellow dent #2) was obtained from a Midwest dry-grind ethanol plant and used without further sieving. Over 70% of the particles were 200 microns to 800 microns in size. Ethanol (anhydrous, 200 proof) was obtained from Aaper Alcohol and Chemical Company, Shelbyville, Ky. Aqueous solutions of ethanol were prepared on a volume/volume basis. Deionized water was used for all experiments.

Analytical Methods: Total solids (TS) was determined by oven drying at 103° C. for six hours. Nitrogen (N) content was determined either by the Kjeldahl method or by the Dumas combustion method using a Leco Nitrogen Analyzer model FP 528. Protein is expressed as N×6.25.

Zein Extraction and Filtration: Zein extraction was performed in a batch mode using dry milled corn and 70% aqueous ethanol. The extraction conditions were 50° C., 30 minutes and solvent-to-solids ratio of 4 ml solvent: 1 gram corn. Upon completion of extraction, corn solids were separated from the corn-ethanol slurry by filtering through Whatman filter paper #1 (mean pore size rating of 11 microns). The filtered extract was kept at room temperature until analyzed and/or further processed by ultrafiltration.

Ultrafiltration and Diafiltration. Two membrane devices were used:

(1) A dead-end stirred cell (Amicon model 502) was operated in the batch mode using flat sheets of polymeric membranes with feed volumes of 200 ml extract. The cell could withstand pressures up to 75 psi, although most of the experiments were done at 20–40 psi applied with a nitrogen gas cylinder. The cell was fitted with a 62 mm membrane disc of area 28.7 $cm^2$. Membranes were preconditioned as described in, e.g., R. Shukla and M. Cheryan, Performance of ultrafiltration membranes in ethanol-water solutions: Effect of membrane conditioning, Journal of Membrane Science, Vol. 198, 2002, pages 75–85. The filtered extract (the feed in the membrane device) was preheated to 50° C., and the cell was continuously stirred and kept at this elevated temperature. Permeate was collected continuously, while retentate samples were collected by releasing the pressure and taking out an aliquot for protein and total solids analyses. For discontinuous diafiltration experiments, fresh solvent (70% ethanol) was added to the retentate in the cell and re-pressurized.

(2) A cross-flow tubular membrane module was operated in the batch mode using membranes obtained from PCI Membrane Systems, Milford, Ohio with 6–10 liters of filtered extract. The PCI membranes were in the form of tubes of 4 feet in length and ½" in diameter. They were tested in the PCI membrane tube tester, which has six perforated stainless steel tubes into which the membrane tubes were fitted. Each tube had its own separate permeate outlet, allowing the testing of six different membranes simultaneously, using the same feed and under the same operating conditions. The feed was pumped from a ten-liter feed tank equipped with a heating/cooling coil using an explosion-proof Procon pump (Procon Products, Murfreesboro, Tenn.) to the module. Transmembrane pressure (TMP) was measured as the average of inlet and outlet pressures, which were measured with pressure transducers (model K1, Ashcroft, Strafford, Conn.). Cross flow rate was measured by an in-line rotameter and set at 15 L/min, equivalent to a velocity of 4 m/s.

A cooling coil was inserted in the feed tank to control temperature using cold tap water. Temperature was measured by a bimetal thermometer in the feed tank. The feed tank was sealed with aluminum foil to minimize evaporation. For discontinuous diafiltration experiments, fresh solvent (70% ethanol) was added to the retentate in the feed tank and pumped through the module. Flux is the volume of permeate per unit membrane area per unit time. It is expressed as liters per square meter per hour (LMH) and is a measure of the capacity of the membrane system.

Results:

AF10 Membrane—The AF10 membrane from PTI, Oxnard, Calif. is made of polyvinylidene difluoride (PVDF) and has a low molecular weight cut-off (MWCO) of 5000. However, it gave quite high fluxes (50–60 LMH) at 20 psi and 50° C. with pure aqueous 70% ethanol after conditioning. Filtered corn extracts were then subjected to several stages of discontinuous diafiltration. As shown in Table I, the initial volume of 200 ml of extract was concentrated 4× to 50 ml. Ten ml of the retentate was saved for analysis. To the remaining 40 ml of retentate was added 40 ml of fresh 70% ethanol and concentrated 2×. This means that 40 ml of permeate was removed in the second stage. This dilution and ultrafiltration was repeated for two more stages.

TABLE I

Ultrafiltration and diafiltration of corn extract with AF10 membrane.
The retentate from each stage was diluted with an equal volume of fresh 70%
ethanol and re-ultrafiltered. Data was obtained at 50° C. and TMP of 20 psi.

| | Feed | | | Retentate | | | Permeate | | | |
|---|---|---|---|---|---|---|---|---|---|---|
| Stage | Volume (ml) | Zein (g/L) | Purity (%) | Vol. (ml) | Zein (g/L) | Purity (%) | Vol. (ml) | Zein (g/L) | Purity (%) | Flux (LMH) |
| 1 | 200 | 7.3 | 43 | 50 | 20.3 | 74 | 150 | 2.7 | 29 | 30 |
| 2 | 80 | 10.1 | 74 | 40 | 20.8 | 103 | 40 | 2.5 | 36 | 27 |
| 3 | 60 | 10.4 | 103 | 30 | 19.3 | 119 | 30 | 2.0 | 60 | 25 |
| 4 | 40 | 9.7 | 119 | 20 | 15.3 | 129 | 30 | 3.2 | 122 | 22 |

TABLE II

Ultrafiltration and diafiltration of corn extract with U20T membrane.
The retentate from each stage was diluted with an equal volume of fresh 70%
ethanol and re-ultrafiltered. Data was obtained at 50° C. and TMP of 20 psi.

| | Feed | | | Retentate | | | Permeate | | | |
|---|---|---|---|---|---|---|---|---|---|---|
| Stage | Volume (ml) | Zein (g/L) | Purity (%) | Vol. (ml) | Zein (g/L) | Purity (%) | Vol. (ml) | Zein (g/L) | Purity (%) | Flux (LMH) |
| 1 | 200 | 6.6 | 40 | 50 | 11.9 | 52 | 150 | 2.9 | 22 | 30 |
| 2 | 80 | 5.9 | 52 | 40 | 9.7 | 53 | 40 | 2.7 | 35 | 30 |
| 3 | 60 | 4.9 | 53 | 30 | 6.3 | 49 | 30 | 3.1 | 60 | 25 |
| 4 | 40 | 3.2 | 49 | 20 | 4.7 | 57 | 20 | 2.7 | 79 | 29 |
| 5 | 20 | 2.3 | 57 | 10 | 3.9 | 75 | 10 | 2.8 | 141 | 20 |

The zein concentration had increased from 7.3 g/L in the initial feed to 15.3 g/L in the final retentate, and the purity had increased from an initial 43% to >95% in the final retentate (the data show >100% zein purity: this is due to errors in nitrogen determinations inherent in the Leco Nitrogen Analyzer as a result of analyzing liquid samples containing ethanol). Flux remained high (22–30 LMH).

U20T Membrane: Similar discontinuous diafiltration experiments were conducted with the flat sheet U20T membrane (20,000 MWCO) from Koch Membrane Systems, Wilmington, Mass. in the Amicon dead-end stirred cell. The corn extract was processed in five stages. As shown in Table II, zein purity had increased from 40% to 75%, but zein concentration decreased from 6.6 g/L to 3.9 g/L by the fifth stage. The flux was 20–30 LMH. This membrane appears to be too "open" for effective purification and concentration of zein.

PCI Tubular Membranes: The PCI membrane selected was the ES404 (4000 MWCO) made of polyethersulfone. The membrane tube was conditioned to 70% ethanol before beginning the experiments. Flux with the pure 70% ethanol was 8 LMH at 15 psi and 30° C. Table III shows an experiment with 9.5 L of corn extract concentrated 5.35-fold by ultrafiltration. Total solids increased twofold, while zein concentration increased threefold, resulting in a purity increase from 48% to 73%. However, zein purity did not appear likely to increase much further with the ultrafiltration/concentration mode shown in Table III.

To increase purity further, a diafiltration experiment was conducted where fresh solvent is added in stages to the retentate. This is shown in Table IV. The initial corn extract volume was 6 L. After the removal of 3.45 L as permeate, 2 L of fresh 70% ethanol was added, and the ultrafiltration repeated. This discontinuous diafiltration cycle was repeated two more times. At the end, the final retentate volume was 2.96 liters, and the zein concentration remained at about 8 g/L. The zein purity had increased from 44% in the initial feed to 97% in the final retentate.

TABLE III

Ultrafiltration of corn extract with PCI 4K MWCO membrane. The initial feed was 9.5 liters of extract with TS = 13.06 g/L and 48% zein purity. Experiments were performed at 40° C., TMP of 40 psi, and cross-flow velocity of 4 m/s.

| | Feed/Retenate | | | | Permeate | | | |
|---|---|---|---|---|---|---|---|---|
| VCR | Volume (L) | Total solids (g/L) | Zein (g/L) | Purity (%) | Vol.(L) | Total Solids (g/L) | Zein (g/L) | Purity (%) | Flux (LMH) |
| 1.00 | 9.50 | 13.06 | 6.29 | 48 | — | — | — | — | 12 |
| 2.24 | 7.69 | 14.24 | 7.39 | 52 | 1.81 | 9.38 | 1.61 | 17 | 11 |
| 1.61 | 5.89 | 15.16 | 8.67 | 57 | 3.61 | 9.36 | 1.84 | 20 | 8 |
| 2.26 | 4.21 | 17.64 | 11.10 | 63 | 5.29 | 9.80 | 1.90 | 19 | 6 |
| 4.23 | 2.25 | 22.42 | 16.07 | 72 | 7.25 | 10.98 | 2.00 | 18 | 4 |
| 5.37 | 1.77 | 24.26 | 17.74 | 73 | 7.73 | 10.84 | 2.06 | 19 | 2 |

TABLE IV

Diafiltration of corn extract with PCI 4K membrane. The initial feed was 6 liters of extract with TS = 12.88 g/L and 44% zein purity. The retentate from each stage was diluted with 2 L of fresh 70% ethanol and re-ultrafiltered. Experiments were performed at 40° C., TMP of 40 psi and cross-flow velocity of 4 m/s.

| | Feed | | | Retentate | | | Permeate | | | |
|---|---|---|---|---|---|---|---|---|---|---|
| Stage | Volume (L) | Zein (g/L) | Purity (%) | Vol. (L) | Zein (g/L) | Purity (%) | Vol. (L) | Zein (g/L) | Purity (%) | Flux (LMH) |
| 1 | 6.00 | 5.73 | 44 | 2.55 | 8.92 | 56 | 3.45 | 1.76 | 17 | 9.2 |
| 2 | 4.55 | 6.34 | 56 | 2.61 | 8.60 | 66 | 1.94 | 1.77 | 23 | 3.1 |
| 3 | 4.61 | 4.87 | 66 | 2.86 | 8.21 | 82 | 1.75 | 1.61 | 36 | 2.5 |
| 4 | 4.86 | 5.60 | 82 | 2.96 | 7.57 | 97 | 1.90 | 2.7 | 40 | 2.1 |

The final retentate shown in Table IV was diafiltered with another five volumes of fresh 70% ethanol, but the zein purity of the dried retentate did not increase further, indicating that the optimum level of diafiltration is probably between three and four stages for the conditions shown in Table IV. As shown, ultrafiltration and diafiltration can thus result in zein purities of greater than 90%.

Figure 3:
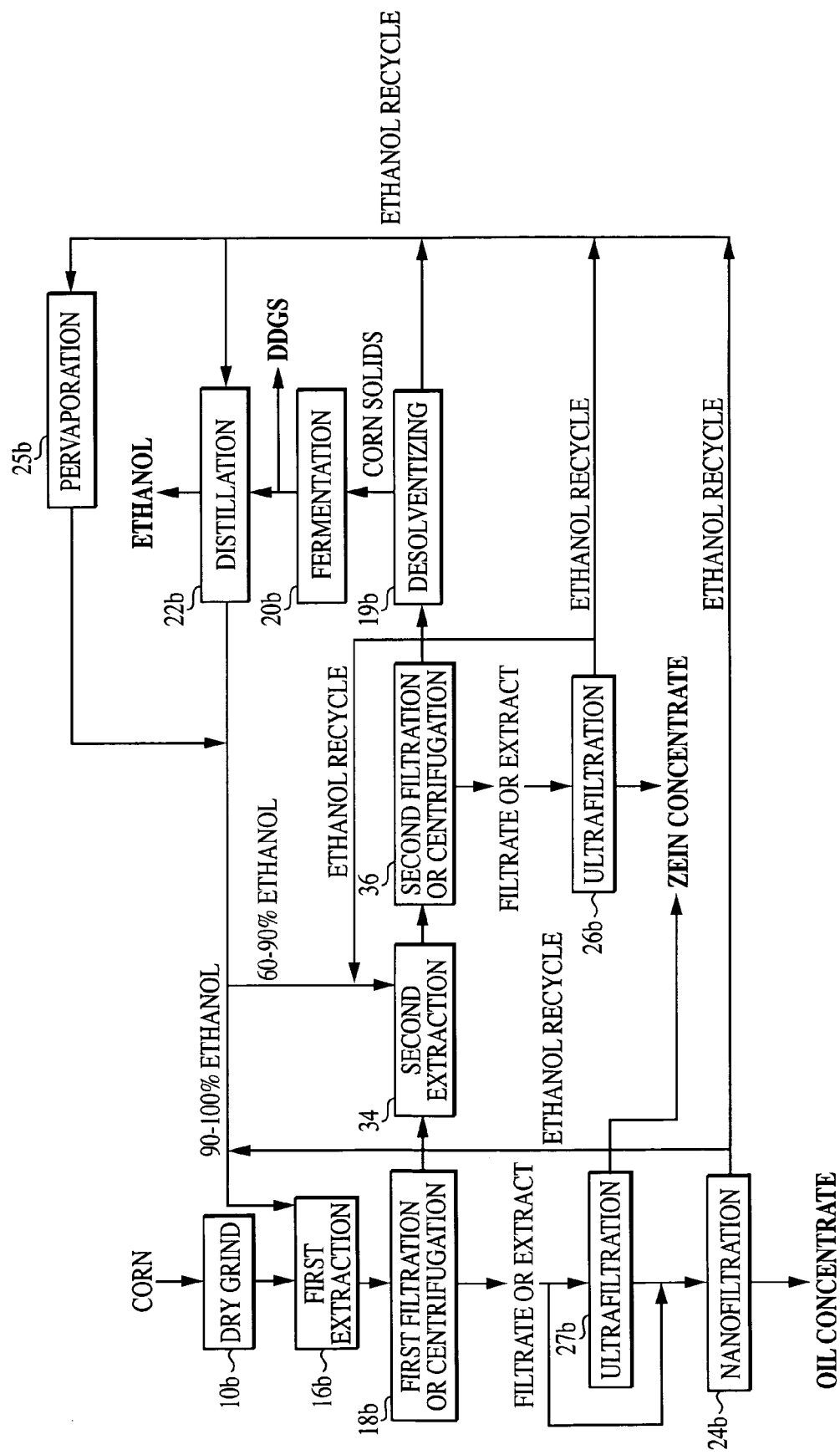
FIG. 3 illustrates combined oil and zein production according to preferred embodiments and methods of the present invention.

FIG. 3 shows the process of the invention applied to a plant for production of both oil and zein, as well as ethanol and DDGS. The first extraction step 16b and first filtration step 18b are the same as in FIG. 1, with a 90–100% ethanol concentration used for oil extraction. The filtrate from 18b is subjected to a nanofiltration step 24b to produce an oil concentrate as described earlier for FIG. 1. Zein extraction is small, especially when concentrations of ethanol approach about 95% ethanol or more. If an amount of zein is significant, then an ultrafiltration step 27b could be conducted before step 24b as described earlier for FIG. 1.

The corn solids from 18b are extracted again in step 34 with a low concentration of ethanol in the range of 60–90%, preferably 70% ethanol/30% water as described for FIG. 2. Zein and ethanol-water obtained from a second filtration step 36 are processed by ultrafiltration step 26b and combined with any zein-alcohol retentate from the ultrafiltration step 27b. The permeate from step 26b is ethanol-water which proceeds as described for FIG. 2. In addition, the zein concentrate can be processed as described with regard to FIG. 2 to produce zein.

The invention therefore provides efficient, flexible and simple processes for production of corn products. The same production line may be used to maximize oil production or zein production. Zein and oil production may also be conducted in parallel fashion. Because the invention may process dry corn, as well as wet milled corn product, it provides the ability to achieve corn product production from dry mill plants used currently for ethanol production only. Reagent for extraction use in the extraction step(s) of the invention is regenerated or produced within the plant itself. Individual equipment components applied in the processes are modular and conventional, thus allowing straightforward modification of existing plants as well as construction of new plants.

While various embodiments of the present invention have been shown and described, it should be understood that other modifications, substitutions and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. A process for removing zein from corn, the process comprising:
    extracting the zein from the corn using an amount of an ethanol solution to produce an extraction solution including oils, zein, corn solids, and ethanol;
    separating corn solids from the extraction solution;
    membrane filtering the extraction solution to restrain zein concentrate from the extraction solution and passing a permeate including ethanol, said membrane filtering including ultrafiltration;
    wherein a ratio between the amount of ethanol solution and the corn in said extracting is between about 10:1 and about 1:1 volume/weight;

wherein the concentration in the ethanol solution in said extracting is between about 60% and about 90% ethanol by volume;
wherein said extracting occurs at a temperature between about 25° C. and about 65° C.

2. The process of claim 1, wherein the corn comprises whole, raw corn.

3. The process of claim 2, further comprising, before said extracting, dry grinding the whole, raw corn.

4. The process of claim 2 wherein said extracting comprises extracting from dry milled corn.

5. The process of claim 1, further comprising purifying zein concentrate obtained in said membrane filtering.

6. The process of claim 5, wherein said purifying comprises evaporating ethanol and water from the zein concentrate.

7. The process of claim 5, wherein said purifying comprises precipitating zein.

8. The process of claim 7, wherein said precipitating comprises adding cold water to said zein concentrate to lower ethanol concentration below approximately 40 percent.

9. The process of claim 5, wherein said purifying comprises diafiltering the zein concentrate using an ethanol solution.

10. The process of claim 9, wherein the ethanol in the ethanol solution for said purifying is between about 70–100% by volume.

11. The process of claim 10, wherein a remainder of the ethanol solution comprises water.

12. The process of claim 1, wherein said membrane filtering comprises diafiltering.

13. The process of claim 1, further comprising:
   membrane filtering the restrained zein concentrate to purify the zein concentrate.

14. The process of claim 13, wherein said membrane filtering the restrained zein concentrate comprises diafiltering the restrained zein concentrate.

15. The process of claim 14, wherein diafiltering the restrained zein concentrate uses a fresh solvent having ethanol.

16. The process of claim 15, wherein the fresh solvent includes ethanol in a concentration greater than the ethanol in the ethanol solution used in said extracting.

17. The process of claim 1, wherein said extracting occurs at a temperature of about 50° C.

18. The process of claim 1, wherein said extracting takes place over a period of between 0.5 and 2 hours.

19. The process of claim 1, wherein said extracting takes place over a period of about 0.5 hours.

20. The process of claim 1, wherein the corn is not wet milled before said extracting.

21. The process of claim 1, further comprising:
   processing the permeate including ethanol to provide recycled ethanol.

22. The process of claim 21, wherein the recycled ethanol is used for diafiltering the zein concentrate.

* * * * *

UNITED STATES PATENT AND TRADEMARK OFFICE
CERTIFICATE OF CORRECTION

PATENT NO. : 7,045,607 B2
APPLICATION NO. : 10/913790
DATED : May 16, 2006
INVENTOR(S) : Cheryan It is certified that error appears in the above-identified patent and that said Letters Patent is hereby corrected as shown below:

Col. 6, line 55, please delete "Strafford" and insert --Stratford-- therefore.

Signed and Sealed this

Twelfth Day of September, 2006

JON W. DUDAS
*Director of the United States Patent and Trademark Office*